United States Patent
Wu et al.

(10) Patent No.: US 8,269,722 B2
(45) Date of Patent: Sep. 18, 2012

(54) GESTURE RECOGNITION SYSTEM AND METHOD THEREOF

(75) Inventors: Jun-Mein Wu, Keelung (TW); Wen-Shiou Luo, Hsinchu (TW); Wei-Yih Ho, Taipei (TW); Chia-Chen Chen, Hsinchu (TW); Cheng-Yuan Tang, Taipei County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 651 days.

(21) Appl. No.: 12/545,340

(22) Filed: Aug. 21, 2009

(65) Prior Publication Data

US 2010/0194679 A1  Aug. 5, 2010

(30) Foreign Application Priority Data

Feb. 2, 2009  (TW) ................................ 98103294 A

(51) Int. Cl.
*G09G 5/00* (2006.01)
*G06K 9/62* (2006.01)
*G06K 9/64* (2006.01)
(52) U.S. Cl. ........................ 345/158; 382/216; 382/217
(58) Field of Classification Search .......................... None
See application file for complete search history.

(56) References Cited

U.S. PATENT DOCUMENTS

| 5,454,043 A * | 9/1995 | Freeman ........................ 382/168 |
| 5,594,469 A * | 1/1997 | Freeman et al. ............... 345/158 |
| 6,115,053 A * | 9/2000 | Perlin ............................ 345/475 |
| 6,128,003 A | 10/2000 | Smith et al. |
| 6,256,033 B1 | 7/2001 | Nguyen |
| 6,788,809 B1 | 9/2004 | Grzeszczuk et al. |
| 7,050,606 B2 | 5/2006 | Paul et al. |
| 7,068,843 B2 * | 6/2006 | Chang et al. .................. 382/203 |
| 7,126,991 B1 | 10/2006 | Mimar |
| 2003/0185445 A1* | 10/2003 | Chang et al. .................. 382/203 |
| 2008/0037875 A1* | 2/2008 | Kim et al. ...................... 382/199 |
| 2010/0194679 A1* | 8/2010 | Wu et al. ........................ 345/156 |

* cited by examiner

*Primary Examiner* — Peter Vincent Agustin
(74) *Attorney, Agent, or Firm* — Morris Manning & Martin LLP; Tim Tingkang Xia, Esq.

(57) ABSTRACT

A gesture recognition system includes an image pick-up device, a processor, an operation engine, an optimal template selection means, and a display terminal. The image pick-up device is for capturing an image containing a natural gesture. The processor is for finding out a skin edge of a skin part from the image, and then classifying the skin edge into multiple edge parts at different angles. The operation engine has multiple parallel operation units and multiple gesture template libraries of different angle classes. These parallel operation units respectively find out gesture templates most resembling the edge parts in the gesture template libraries of different angle classes. The optimal template selection means selects an optimal gesture template from the resembling gesture templates found out by the parallel operation units. The display terminal is for displaying an image of the optimal gesture template. Thereby, marker-less and real-time gesture recognition is achieved.

28 Claims, 9 Drawing Sheets

GESTURE RECOGNITION SYSTEM AND METHOD THEREOF

CROSS-REFERENCE TO RELATED APPLICATIONS

This non-provisional application claims priority under 35 U.S.C. §119(a) on Patent Application No(s). 098103294 filed in Taiwan, R.O.C. on Feb. 2, 2009 the entire contents of which are hereby incorporated by reference.

BACKGROUND OF THE INVENTION

1. Technical Field

The present disclosure relates to a gesture recognition system and a method thereof, in particular, to a gesture recognition system and a method thereof capable of recognizing a natural gesture by using a parallel gesture template matching manner, and realizing marker-less and real-time gesture recognition.

2. Related Art

Gesture detection is widely applied. However, for marker-less gesture detection, especially when a template matching technology is employed, the position and posture of a hand must be resolved, which generally requires a large amount of operation performance, and is thus difficult to achieve the application requirement of real-time recognition.

In the technology disclosed in the published U.S. Pat. No. 6,128,003, a moving image object is found out in an image, and it is assumed that the only moving object in the image is a gesture. First of all, gesture templates at all angles are established, and rotational vectors are resolved for all the templates. Then, a shape and a rotational vector of the moving object are resolved from the captured read-time image, and are matched with the rotational vectors of the established templates one by one, so as to find out the most resembling template. In addition, in order to accelerate the speed of distinguishing the image object, the rotational vectors of the templates are respectively analyzed and classified into hierarchical data structures in accordance with their characteristics, so as to avoid matching all the data in a template database each time, thereby achieving the effect of real-time recognition.

In the published U.S. Pat. No. 6,256,033, it is highlighted that a gesture recognition method disclosed therein achieves the effect of real-time recognition. In the method, a motion object is measured and then fetched to be matched with template data in a previously established template database, so as to achieve the effect of real-time recognition.

In both of the above two known techniques, it is assumed that the moving object in the image is a hand position, and the reason is that, for template matching, the complexity of a background tends to affect the result of the template matching. Therefore, in order to quickly separate the background and the foreground, and perform the template matching for hand more correctly without the background interference, the hand must be assumed as a moving object.

Besides the methods of matching with templates, other methods of gesture tracking based on color are also provided. For example, in the published U.S. Pat. No. 6,788,809, an object in an image is defined by color segmentation and gesture recognition. First, a color in the image corresponding to that of the object is selected from the image. Then, depths for all image grids in the image are set on a stereo camera, and the image grids corresponding to undesired depth values are eliminated, thereby achieving the effect of background subtraction. After that, an already established gesture template database is employed to be matched with the image, so as to know about messages about the gestures. In this method, two cameras are used for calculating the distances and depths of all the grids in the image, and a scope of the hand is defined with the known distance and depth of the hand, such that the background is removed before the template matching. However, a depth critical point to be resolved must be controlled, beyond which the hand is considered as the background and cannot be resolved.

In the published U.S. Pat. No. 7,050,606, colors are used for detecting an object such as a hand or body, and assisting detection with motion tracking, so as to achieve a more accurate and rapid effect. This technology assists detection through motion tracing, thereby accelerating the operation speed of an image.

SUMMARY OF THE INVENTION

Accordingly, the present disclosure is a gesture recognition system comprising an image pick-up device, a processor, an operation engine, an optimal template selection means, and a display terminal.

The image pick-up device is used for capturing an image containing a gesture.

The processor is used for finding out a skin edge of a skin part from the image, and then classifying the skin edge into multiple edge parts at different angles.

The operation engine has multiple parallel operation units and a template database recording multiple gesture templates representing different gestures. The gesture templates are classified by angles, and are respectively stored in gesture template libraries of different angle classes so as to be used for template matching by different parallel operation units. The aforementioned edge parts at different angles are respectively sent to the parallel operation units, so as to find out the gesture templates most resembling the edge parts in the corresponding gesture template libraries of different angle classes.

The optimal template selection means further selects an optimal gesture template from the resembling gesture templates found out by the parallel operation units.

The display terminal is used for displaying a gesture image represented by the optimal gesture template.

A gesture recognition method is also provided.

The method comprises the following steps.

A template database is established, multiple gesture templates representing different gestures are created, a gesture information denoted by each gesture template is defined, and then the gesture templates are classified by angles and stored in gesture template libraries of different angle classes.

An image containing a gesture is captured.

A skin part is found out from the image, and an edge detection is performed on the skin part to obtain a skin edge of the skin part.

The skin edge is classified by angles into multiple edge parts of different angles.

Template matching is performed to find out the gesture templates most resembling the edge parts in the gesture template libraries of different angles, respectively.

An optimal gesture template is found out from the resembling gesture templates found out in the previous step.

A gesture image represented by the optimal gesture template found out in the previous step is displayed.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
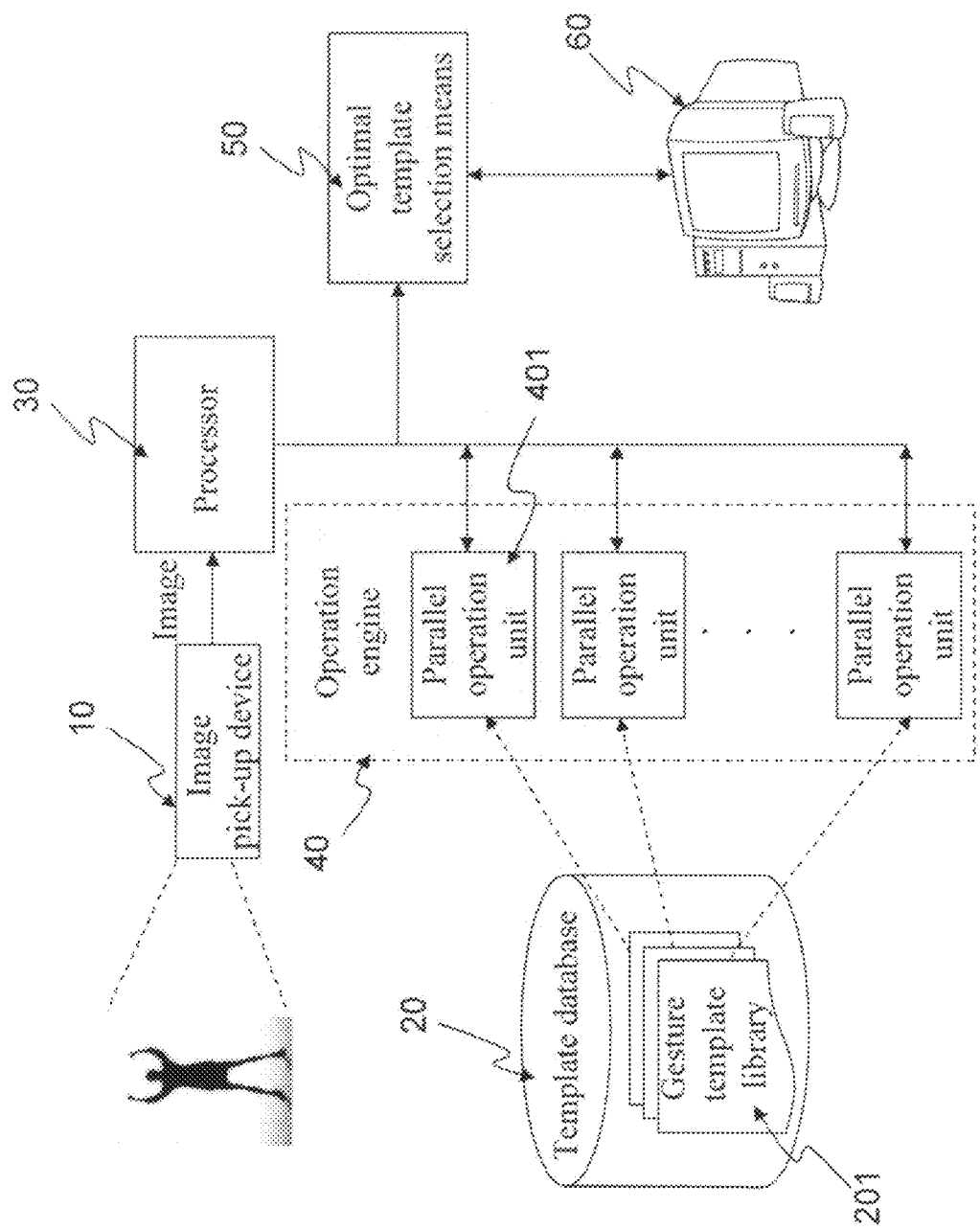
FIG. 1 shows an exemplary embodiment of a gesture recognition system according to the present disclosure.

FIG. 1 shows an exemplary embodiment of a gesture recognition system. The system comprises an image pick-up device 10, a template database 20, a processor 30, an operation engine 40, an optimal template selection means 50, and a display terminal 60.

The image pick-up device 10 may be a common camera used for capturing an image data containing a hand image, and the image may be a continuous color digital image.

The template database 20 records therein multiple gesture templates representing different gestures. These gesture templates are classified by angles and are respectively stored in gesture template libraries 201 of different angle classes.

The processor 30 communicates with the image pick-up device 10 to obtain the image. The processor 30 has an image processing procedure used for finding out a skin part from the image, producing a skin edge through edge detection, and then classifying the skin edge into multiple edge parts of different angle classes according to angles of the skin edge.

The operation engine 40 has multiple parallel operation units 401. The parallel operation units 401 respectively invoke the gesture template libraries 201 of different angle classes to perform template matching at different angles. The aforementioned edge parts of different angle classes are respectively sent to different parallel operation units 401 for template matching, so as to find out the most resembling gesture templates in the gesture template libraries 201 of different angle classes.

The optimal template selection means 50 further selects an optimal gesture template from the resembling gesture templates found out by the parallel operation units 401.

The display terminal 60 is used for displaying a gesture image represented by the optimal gesture template.

Figure 2:
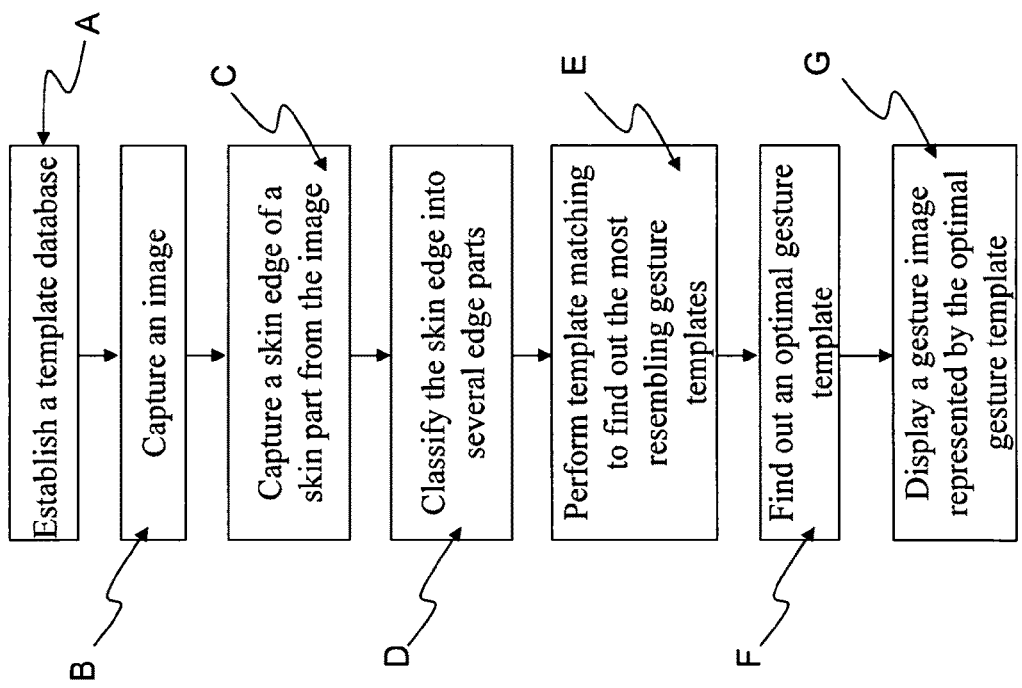
FIG. 2 is a flow chart of an exemplary embodiment of a gesture recognition method according to the present disclosure.

FIG. 2 is a flow chart of an exemplary embodiment of a gesture recognition method. The method comprises the following steps.

A. A template database is established, an edge processing is performed on hand images of different gestures to obtain gesture edges representing different gestures, the gesture edges are stored as gesture templates and gesture information denoted by each gesture template (for example, the instruction or meaning conveyed by a gesture) is defined, and then the gesture templates are classified by angles and stored in the gesture template libraries 201 of different angle classes. Specifically, edge pixels constituting the gesture edges are classified according to the angle of each edge pixel in the gesture edges, the edge pixels within the same angle range are gathered to form a single gesture template, each gesture template represents a certain kind of gesture, and then the gesture templates of different angles are respectively stored in the template database with different angle classes.

B. An image data containing a hand image is captured.

C. A skin part is found out from the image, and an edge detection is performed on the skin part to obtain a skin edge of the skin part.

D. The skin edge is classified by angles into multiple edge parts of different angles through image processing.

E. Template matching is performed on the edge parts of different angle classes with the gesture templates in the gesture template libraries 201 of different angle classes, so as to find out the gesture templates most resembling the edge parts in the gesture template libraries 201 of different angles classes, respectively.

F. An optimal gesture template is found out from the resembling gesture templates at different angles found out in the previous step.

G. A gesture image represented by the optimal gesture template found out in the previous step is displayed.

The image data containing the gesture image may be a color image.

In the establishment of the gesture template libraries 201, generally, hand images of different gestures (which may be produced by photography or establishing a computer 3D model) are first captured. Then, an edge detection is performed on the hand images of different gestures to obtain gesture edges representing different gestures. Edge pixels constituting the gesture edges are classified according to the angle of each edge pixel in the gesture edges, the edge pixels within the same angle range are gathered to form a gesture template 21 (see FIG. 3), and each gesture template 21 represents a certain kind of gesture. Afterward, the gesture templates 21 of different angles are respectively stored in the gesture template libraries 201 of different angle classes, so that in template matching, the templates can be matched with the edge parts of different angle classes. Therefore, the gesture edge of a single gesture may produce multiple gesture templates 21 at different angles which are stored in the gesture template libraries 201 of different angle classes.

Figure 3:
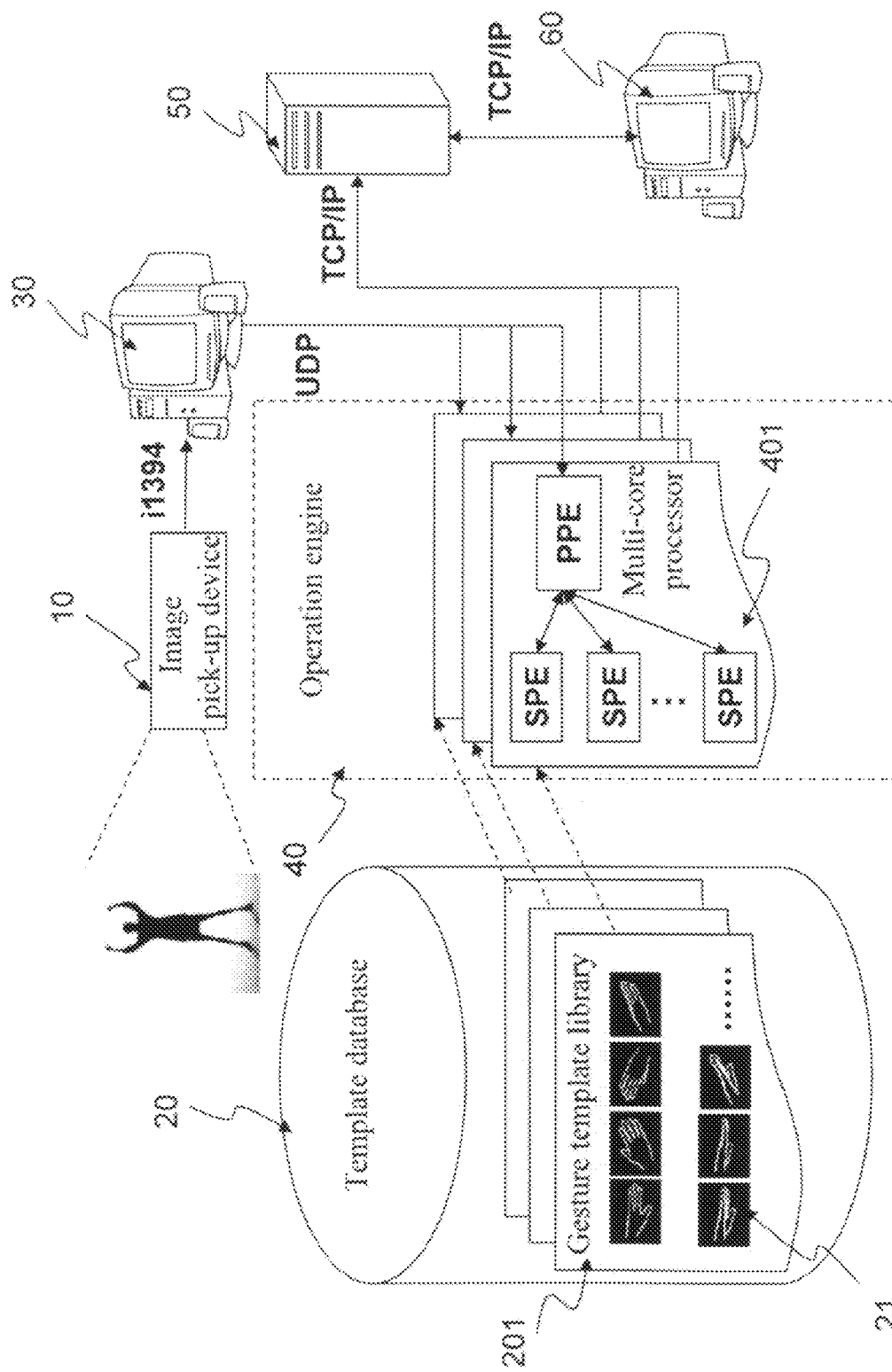
FIG. 3 shows another exemplary embodiment of the gesture recognition system according to the present disclosure.

FIG. 3 shows a specific exemplary embodiment of the gesture recognition system of the present disclosure. In the figure, the processor 30 may be a personal computer (PC), and the operation engine 40 is mainly used for performing burdensome template matching operations. In an exemplary embodiment, the parallel operation unit 401 is a multi-core processor, i.e., the operation engine 40 herein is of a parallel operation architecture constituted by one or more multi-core processors, and the multi-core processor may use a server to provide an excellent operation processing performance. In an exemplary embodiment of the present disclosure as shown in FIG. 3, the operation engine 40 adopts eight multi-core processors respectively responsible for template matching at different angles. Generally, the eight multi-core processors are allocated with gesture template libraries 201 of different angle classes, so as to be matched with the edge parts of different angle classes. The optimal template selection means 50 may be another computer or multi-core processor, for further selecting an optimal gesture template in the resembling gesture templates found out by the parallel operation units 401. In order to achieve the effect of real-time recognition, preferably, the optimal template selection means 50 is a multi-core processor. In the exemplary embodiment of FIG. 3, nine servers are used, in which eight servers constitute the parallel operation units 401 respectively responsible for template matching at different angles, and the other server functions as the optimal template selection means 50 responsible for integrally collecting the template matching results returned by the eight servers, finding out an optimal gesture template from the matching results, and then transmitting the optimal gesture template to the display terminal 60. The display terminal 60 may be a computer capable of drawing or image processing, and is mainly used for displaying the gesture image represented by the optimal gesture template. An IEEE1394 interface and transmission lines may be used for transmitting data between the processor 30 and the image pick-up device 10. Data transmission between multiple computers or servers is preferably realized through a local area network (LAN). Specifically, the processor 30 sends the edge parts simultaneously to multiple multi-core processors through User Datagram Protocol broadcast (UDP broadcast). The multi-core processors only perform template matching on the edge parts consistent with the pre-allocated angle ranges, and the use of UDP broadcast to transmit the edge parts to the multi-core processors may achieve a high-efficiency data transmission effect with a limited bandwidth. The communication between the multi-core processors in the operation engine 40 and the optimal template selection means 50 (another multi-core processor), as well as the communication between the optimal template selection means 50 and the display terminal 60 may be realized through Transmission Control Protocol/Internet Protocol (TCP/IP) for data transmission.

In the exemplary embodiment of FIG. 3, the disclosed gesture recognition system is realized by multiple computers or servers and a communication network. Definitely, the system may also be realized by dedicated devices, for example, a game host having high operation ability combined with a small-scale image pick-up device. These modifications can be understood and implemented by those of ordinary skill in the art after knowing the technical means of the present disclosure.

Figure 4:
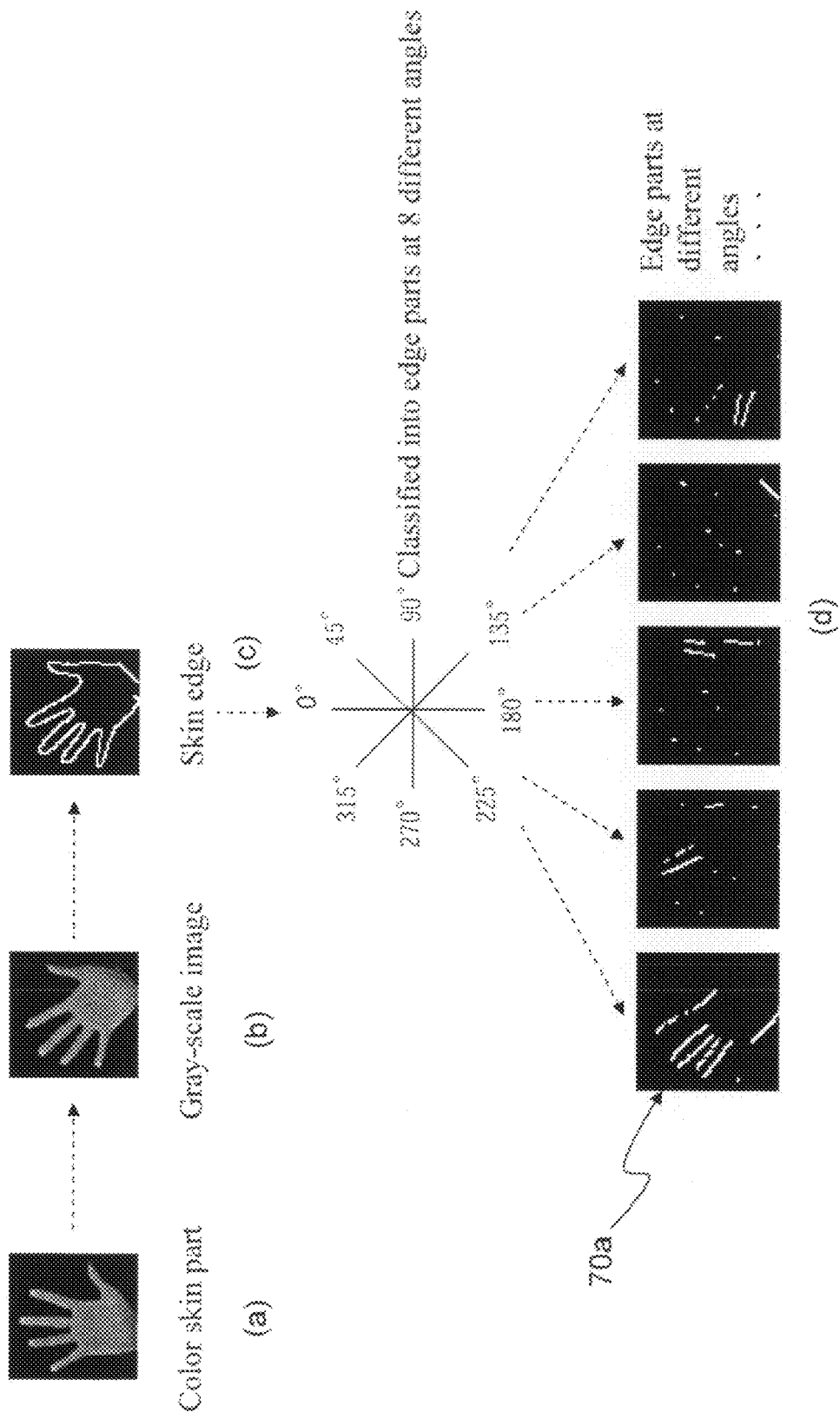
FIG. 4 shows an example with graphics of producing edge parts in an image processing procedure of the present disclosure.

The aforementioned processor 30 is built with a skin processing procedure and an edge detection procedure. The skin processing procedure may be used for removing background noises contained in both color image or monochromatic(e.g. gray-scale) image, so that it is relatively easy to find out a hand image contained in the image. When applied to color image, first, a skin part is filtered from the color image (see (a) in FIG. 4), then the skin part is converted into a gray-scale image (for example, 8-level gray-scale) (see (b) in FIG. 4), a skin edge of the skin part is found out (see (c) in FIG. 4), and afterward the skin edge is classified by angles into edge parts 70a at different angles (see (d) in FIG. 4). Generally, for an image subjected to a binarization process, the most common method to find out the edges of the image is to use an edge detector (for example, Sobel filter). The color image captured by the image pick-up device 10 may be substantially an RGB image. Firstly, skin information in the RGB image is filtered through a skin processing procedure so as to find out a skin region, and the skin edge in the skin region is then found out by using the edge detection procedure (see (c) in FIG. 4). In order to accelerate the speed of template matching, the processor 30 is further utilized to classify the skin edge into the edge parts 70a at different directions. Specifically, sets of the edge pixels within the same angle ranges are respectively found out from the edge pixels constituting the skin edge, then stored as the edge parts 70a, and further classified into the edge parts 70a of different angle classes according to the angles of the edge pixels contained in the edge parts 70a. The classified edge parts are shown by 70a (see (d) in FIG. 4), and the edge part 70a in each angle range is basically a portion of a complete skin edge. In an exemplary embodiment of the present disclosure, the skin edge is classified into edge parts of eight angle ranges, and the eight different angle ranges are obtained by equally dividing a 360° round angle, namely, [1° to 45°], [46° to 90°], [91° to 135°], [136° to 180°], [181° to 225°], [226° to 270°], [271° to 315°], and [316° to 360°]. Gradients of the edge pixels of the skin edge in horizontal and vertical directions are calculated by using an edge detector (for example, Sobel filter) to obtain the angles, and then the edge pixels are classified into the edge parts at eight different angles according to the angles. Till now, the completed edge part is substantially a lattice image constituted by multiple edge pixels represented by only "1" and "0", in which "1" represents a bright spot, and "0" represents that no skin edge occurs at the spot of this position.

Figure 5B:
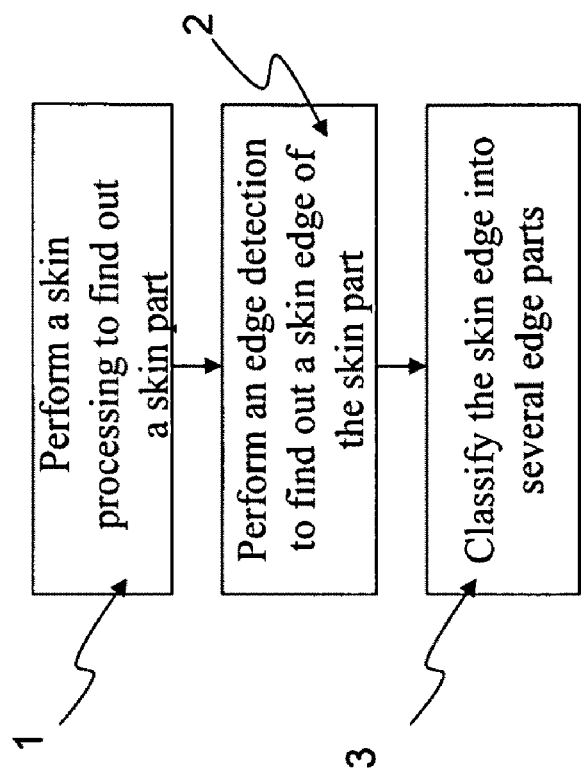
FIGS. 5A and 5B are a flow chart of an exemplary embodiment of producing the edge parts in the image processing procedure of the present disclosure.
Figure 5A:
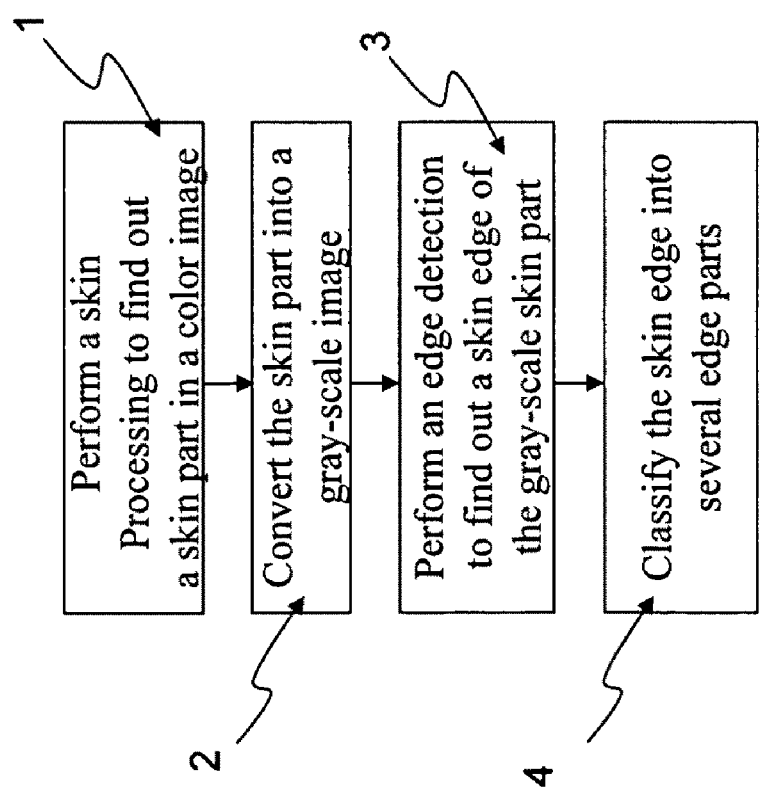

A complete process of the aforementioned skin processing and edge detection applied to color image is shown in FIG. 5A. The process comprises the following steps:

1. A skin processing is performed to find out a skin part in a color image.
2. The found skin part is converted into a gray-scale image.
3. An edge detection is performed to find out a skin edge of the skin part.
4. The skin edge is classified by angles into edge parts 70a at different angles.

The procedure of skin processing and edge detection may also apply to monochromatic (e.g. gray-scale) image as shown in FIG. 5B, which comprises the following steps:

1. A skin processing is performed to find out a skin part in a monochromatic(e.g. gray-scale) image.
2. An edge detection is performed to find out a skin edge of the skin part.
3. The skin edge is classified by angles into edge parts 70a at different angles.

Figure 6:
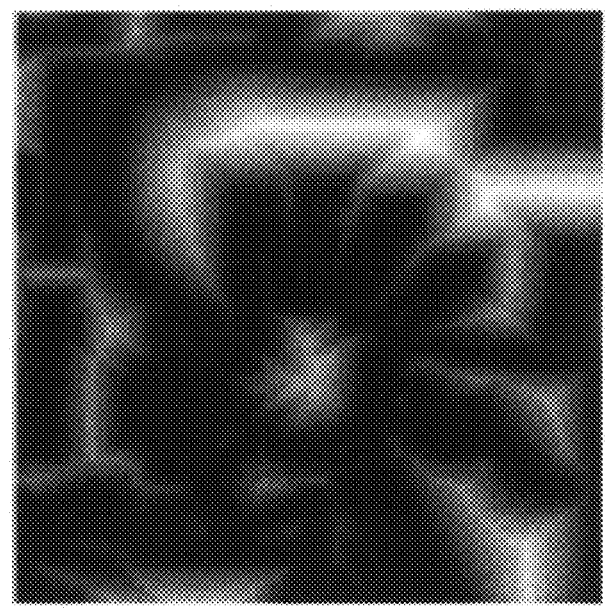
FIG. 6 shows an example with graphics of producing a DT image from the edge parts after a DT operation.
Figure 6:
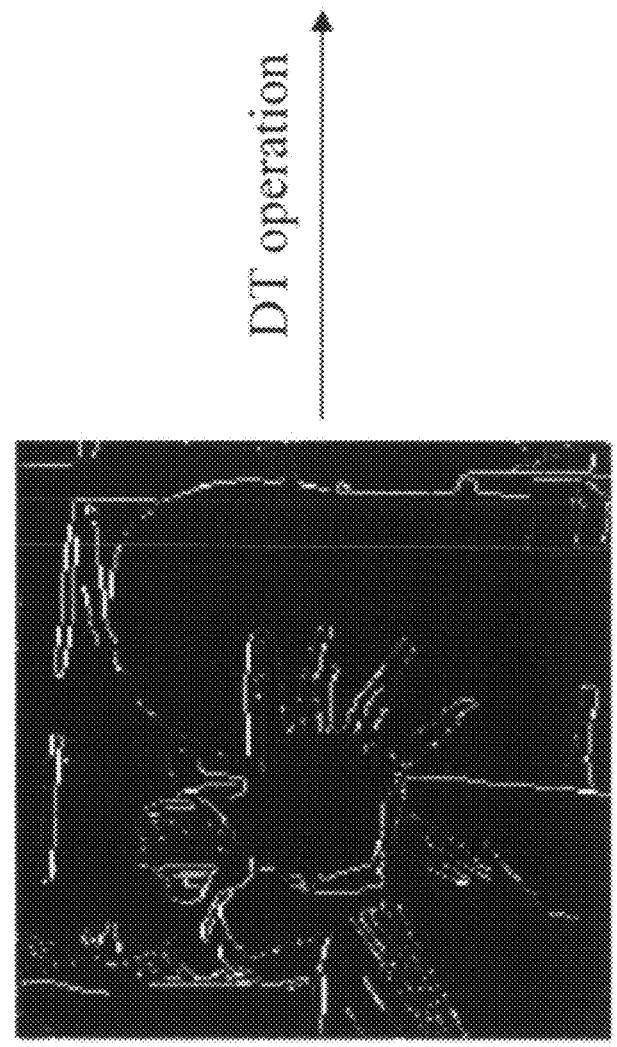
Figure 7:
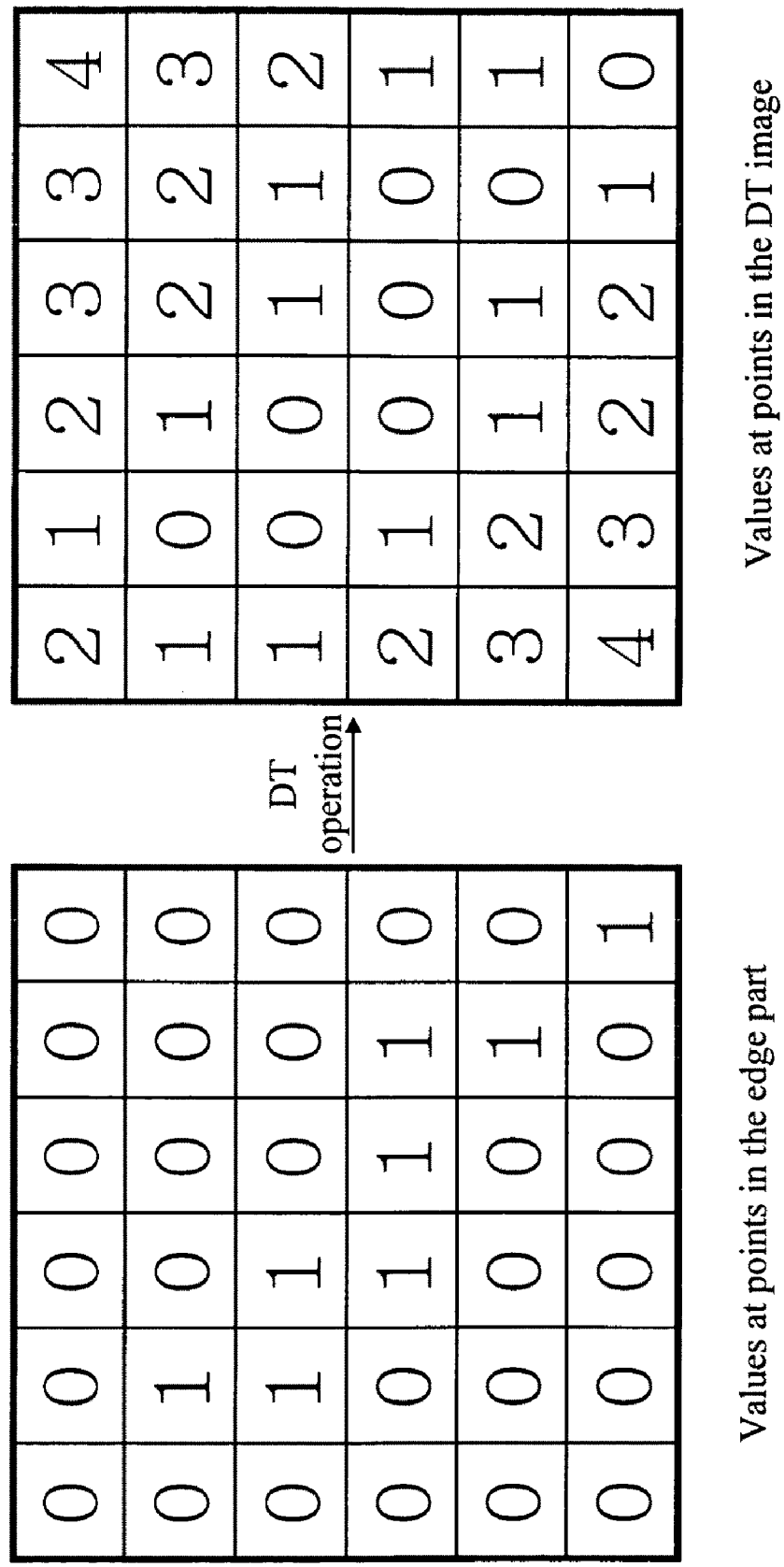
FIG. 7 shows values of the edge parts and the DT image generated after the DT operation.

During template matching, in an exemplary embodiment of the present disclosure, a similarity between the gesture templates 21 and the edge parts 70a is obtained by employing a distance transform (DT) technology, so as to find out the gesture templates 21 most resembling the edge parts 70a from the gesture templates 21 of different angles. After receiving the edge parts 70a from the processor 30, the foregoing parallel operation units 401 perform a DT operation according to location coordinates of the edge pixels therein to produce a DT image. The DT image is a gray-scale image (see FIG. 6), and the intensity of each pixel in the DT image does not represent a brightness value but a distance from each pixel in the DT image to the edge pixels. According to the method of the present disclosure, in the DT image, "0" represents positions of the edge pixels in the edge part 70a, the values of the remaining points in the DT image represent distances to the edge pixels, the points closest to the edge pixels are represented by "1", the less closest points are represented by "2", and the rest can be deduced in the same way. On the left side of FIG. 7, the values of various points in the original edge part 70a are shown, in which "1" represents the positions of the edge pixels, and the positions with no edge pixels are represented by "0". On the right side of FIG. 7, the results after the DT operation are shown, in which "0" represents the positions of the edge pixels in the original edge part 70a, and the remaining values respectively represent the distance of each point in the DT image to the edge pixels.

During template matching, each parallel operation unit 401 is responsible for matching the edge part 70a with the gesture template in one angle range. For example, the first parallel operation unit 401 is responsible for matching the edge part 70a with the gesture template 21 in the range of [1° to 45°], the second parallel operation unit 401 is responsible for matching the edge part 70a with the gesture template 21 in the range of [46° to 90°], and the rest can be deduced in the same way. The matching method is to first perform a DT operation on the edge part 70a to produce a DT image, and then the gesture templates 21 are used to search from the upper-left corner to the lower-right corner of the DT image. The search method is to perform a convolution operation on the gesture template 21 and the DT image at each search position, and then an approximate value representing a similarity between the gesture template 21 and the DT image is obtained. After that, by using this method, each gesture template 21 is matched with the DT image to find out the gesture template 21 with the smallest approximate value. Finally, the smallest approximate value and the corresponding gesture template 21 are sent to the optimal template selection means 50. As the above matching method is very time-consuming and burdensome, the present disclosure may adopt a parallel operation architecture constituted by multiple multi-core processors to perform the template matching, and allocate the gesture template libraries 201 in different angle ranges to different multi-core processors, thereby enhancing the speed of template matching, and achieving the effect of real-time gesture recognition.

Figure 9:
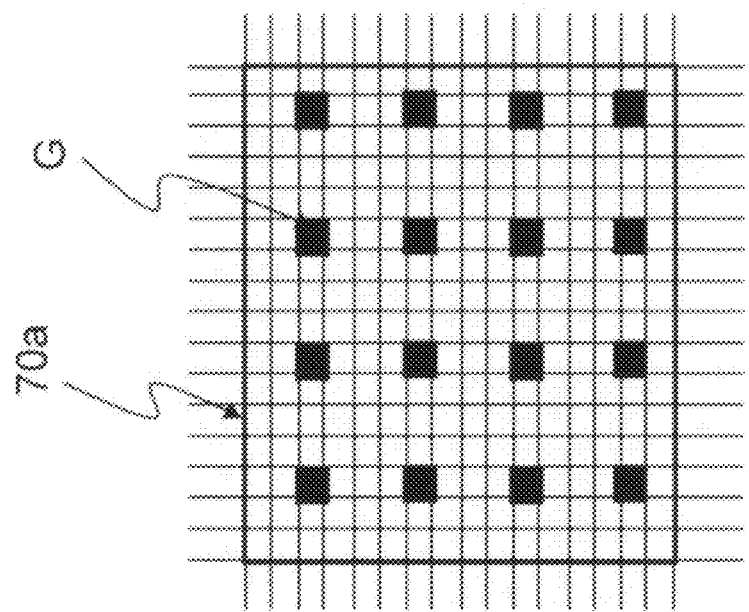
FIG. 9 shows an exemplary embodiment of performing rapid template matching in the DT image.
Figure 8:
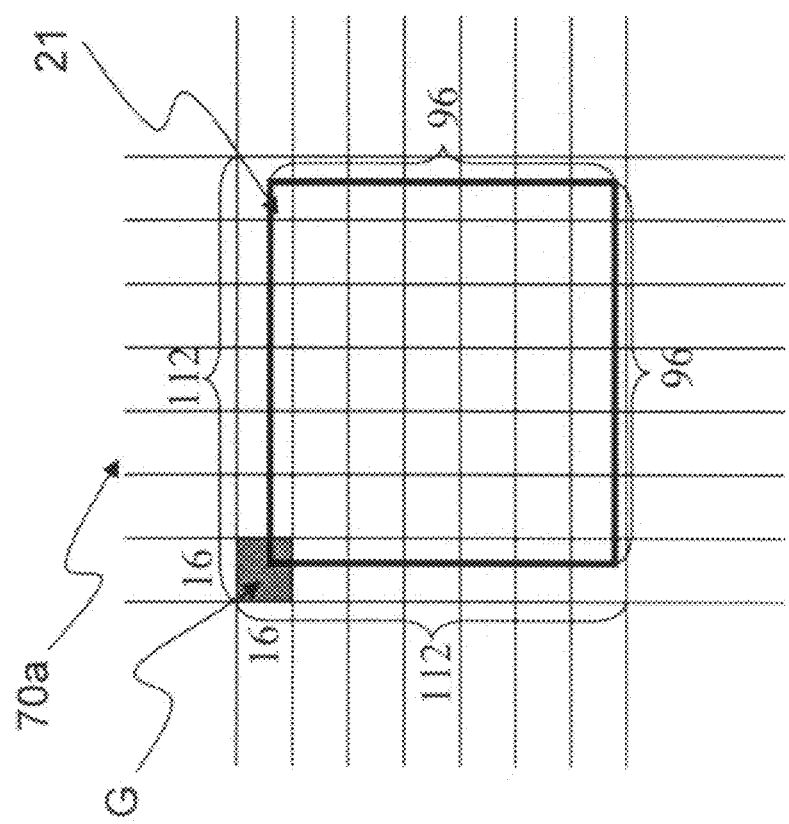
FIG. 8 shows one of the exemplary embodiments of template matching in the DT image by using gesture templates.

In an exemplary embodiment of the present disclosure, a method for improving the template matching speed is also provided. The gesture template 21 does not move one grid point each time when moving in the DT image. In the present disclosure, several predetermined equally divided positions of the gesture template 21 in the DT image are first searched to find out a scope where the hand is most likely to appear, and then a fine template matching is performed on the scope, so as to improve the speed of template matching. In an exemplary embodiment as shown in FIG. 8, the size of the gesture template 21 is 96*96 (pixels), and the size of the edge part 70a is 800*600 (pixels). The size of a gird G in each search is set as 16*16 (pixels), and altogether 16 grids G are set in the equally divided positions of the edge part 70a (see FIG. 9). In order to improve the speed of template matching, a scope where the hand is most likely to appear is found out from the positions of the 16 girds in the edge part 70a. In one of the exemplary embodiments, a number of the appearing skin pixels in each grid G is taken as the condition for determining whether the hand is most likely to appear or not. If the number of the appearing skin pixels is greater than a threshold (for example, 50 pixels), a fine template matching is performed around the position of this grid G.

Figure 10:
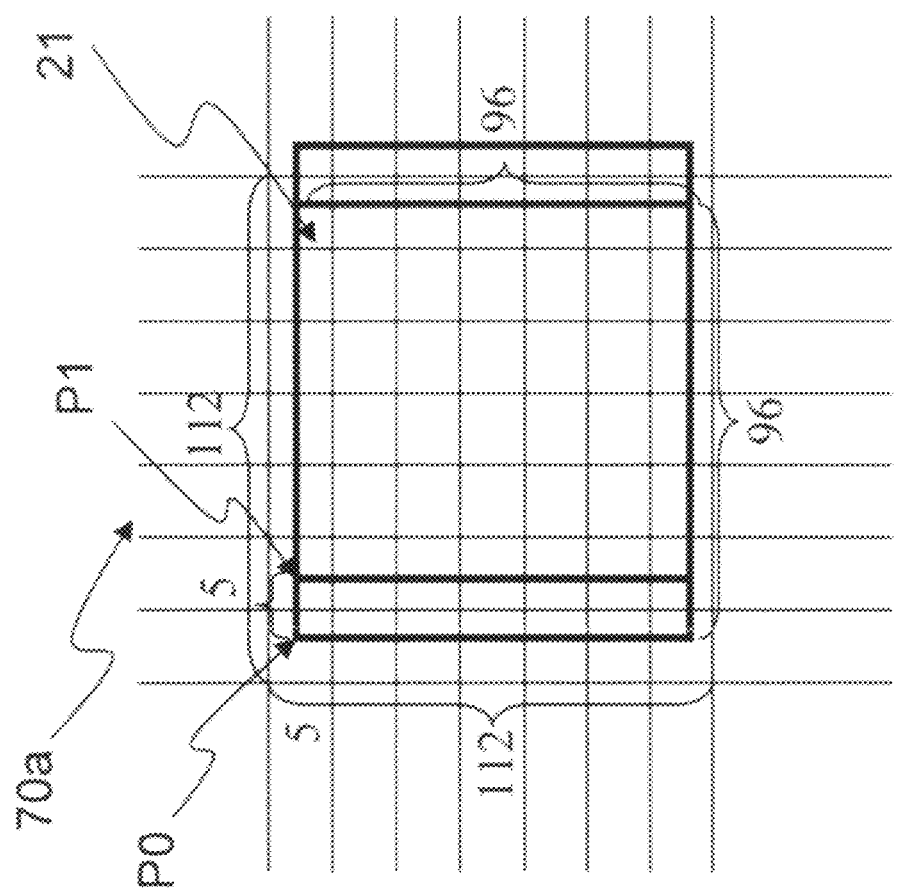
FIG. 10 shows another exemplary embodiment of performing rapid template matching in the DT image.

In another method of improving the speed of template matching, the gesture template 21 moves with a predetermined offset in the DT image to perform the template matching. For example, the number of the offset pixels at each time of the gesture template 21 is set as five. As shown in FIG. 10, the matching position (assumed to be P0) of an initial point of the gesture template 21 in the DT image is five pixels away from the next matching position (assumed to be P1). Therefore, the matching times of the gesture template 21 in the DT image are reduced, thus raising the speed of matching. Definitely, the offset may not exceed the size of the gesture template 21 in case of a matching omission, so as to avoid affecting the matching accuracy.

Referring to FIG. 3, a server such as a cell blade having a special multi-core processor (cell processor) is taken as an example below. The server comprises a power processor element (PPE) and 16 synergistic processor elements (SPEs). During template matching, the PPE is first started to re-allocate the gesture template library 201 already allocated to a certain angle range to the desired SPEs, and allocate the received edge part 70a to the SPEs for performing a DT operation to produce a DT image. Then, a template matching is performed by the SPEs, respectively. After each SPE has completed the matching, the matching results are returned to the PPE. The PPE integrates the matching results returned by the SPEs, and finds out the gesture template 21 of the best result (that is, the smallest value obtained by the convolution operation) and related information thereof from the results. This gesture template 21 is the gesture template 21 most resembling the edge part 70a in this angle range.

When each multi-core processor sends the most resembling gesture template 21 and related information thereof found out from the matching results to the optimal template selection means 50, the optimal template selection means 50 further finds out an optimal gesture template 21 from the most resembling gesture templates 21. Likewise, the optimal gesture template 21 is one of the most resembling gesture templates 21 with the smallest value in the convolution operation.

A marker-less gesture recognition system capable of recognizing a gesture in real time is provided in an exemplary embodiment of the present disclosure.

The gesture recognition method of the present disclosure also provides a means of improving the speed of template matching. First, several predetermined equally divided positions in the edge part are searched to find out a scope where the hand is most likely to appear, and then a fine template matching is performed on the scope, so as to achieve the effect of raising the speed of template matching.

The technical schemes of the present disclosure have the following efficacies.

A skin processing is first performed on the color image or monochromatic(e.g. gray-scale) image captured by the image pick-up device through the image processing procedure of the image processor. Thereby, non-hand images are removed and background interference is reduced, and motion detection is not required to find the hand image.

In the gesture recognition method of the present disclosure, the gesture templates in the template database are first classified by angles, the skin edge in the image is also classified by angles into edge parts at different angles, and then the edge parts are sent to multiple parallel operation units responsible for template matching in different angle ranges, so that the speed of template matching is improved, and the effect of real-time gesture recognition is achieved.

The present disclosure does not need to assume that the moving object is a hand, and no matter whether the hand is in motion or in a static state in the image, the gesture can always be resolved correctly in real time.

What is claimed is:
1. A gesture recognition system, comprising:
an image pick-up device, for capturing an image data containing a hand image;
a template database, for recording multiple gesture templates representing different gestures, wherein the gesture templates are classified by angles and are respectively stored in gesture template libraries of different angle classes;
a processor, for communicating with the image pick-up device and obtaining the image data, finding out a skin part from the image data, producing a skin edge by using an edge detection means, and then classifying the skin edge into multiple edge parts of different angle classes according to angles of the skin edge;

an operation engine, having multiple parallel operation units respectively for performing template matching at different angles, wherein the edge parts of different angle classes are respectively sent to different parallel operation units for template matching, so as to find out the gesture templates most resembling the edge parts in the corresponding gesture template libraries of different angle classes;

an optimal template selection means, for further selecting an optimal gesture template from the resembling gesture templates found out by the parallel operation units; and a display terminal, for displaying a gesture image represented by the optimal gesture template.

2. The gesture recognition system according to claim 1, wherein the image data is a color image.

3. The gesture recognition system according to claim 1, wherein the gesture template records a gesture edge of a gesture.

4. The gesture recognition system according to claim 3, wherein edge pixels in the gesture edge are classified by angles, the edge pixels in the same angle range are gathered to form the gesture template, and the gesture templates of different angles are respectively stored in the template database with different angle classes.

5. The gesture recognition system according to claim 1, wherein the skin part is filtered from the image by using a skin processing method, and the skin edge of the skin part is found out with an edge detector.

6. The gesture recognition system according to claim 2, wherein the skin part is filtered from the image by using a skin processing method, the skin part is then converted into a gray-scale image, and the skin edge of the skin part is found out with an edge detector.

7. The gesture recognition system according to claim 5, wherein the edge detector is a Sobel filter.

8. The gesture recognition system according to claim 1, wherein sets of the edge pixels within the same angle ranges are respectively found out from the edge pixels constituting the skin edge, then stored as the edge parts, and further classified into the edge parts of different angle classes according to the angles of the edge pixels contained in the edge parts.

9. The gesture recognition system according to claim 8, wherein gradients of the edge pixels of the skin edge in horizontal and vertical directions are calculated by using the edge detector to obtain the angles, and then the edge pixels are classified into the edge parts at different angles according to the angles.

10. The gesture recognition system according to claim 1, wherein the skin edge is classified into eight angle ranges equally dividing a 360° round angle.

11. The gesture recognition system according to claim 1, wherein the processor is a personal computer (PC); the parallel operation units of the operation engine are multi-core processors; the optimal template selection means is a computer; the display terminal is a computer capable of drawing, and is used for displaying the gesture image represented by the gesture template; the processor sends the edge parts simultaneously to the multi-core processors through User Datagram Protocol broadcast (UDP broadcast), and the multi-core processors only perform template matching on the edge parts consistent with the pre-allocated angle ranges; the communication between the multi-core processors in the operation engine and the optimal template selection means, as well as the communication between the optimal template selection means and the display terminal is realized through Transmission Control Protocol/Internet Protocol (TCP/IP) for data transmission.

12. The gesture recognition system according to claim 1, wherein in template matching, a similarity between the gesture template and the edge part is obtained by using a distance transform (DT) technology.

13. The gesture recognition system according to claim 12, wherein the DT technology performs a DT operation on the edge part to produce a DT image, and searches each position in the DT image by using the gesture template, then performs a convolution operation on the gesture template and the DT image at each of the search positions to generate an approximate value representing a similarity between the gesture template and the DT image, and finds out the gesture template with the smallest approximate value, and finally sends the gesture template with the smallest approximate value to the optimal template selection means.

14. The gesture recognition system according to claim 1, wherein in template matching, several predetermined equally divided positions of the gesture template in the edge part are first searched to find out a scope where the hand is most likely to appear, and then a fine template matching is performed on the scope.

15. The gesture recognition system according to claim 14, wherein the scope where the hand is most likely to appear refers to a scope with a number of the appearing skin pixels greater than a threshold.

16. A gesture recognition method, comprising:
a. establishing a template database, storing gesture edges representing different gestures as gesture templates, and classifying the gesture templates by angles and storing the classified gesture templates into gesture template libraries of different angle classes;
b. capturing an image data containing a hand image;
c. finding out a skin part from the image, and performing an edge detection on the skin part to obtain a skin edge of the skin part;
d. classifying by angles the skin edge into multiple edge parts of different angle classes;
e. matching the edge parts of different angle classes with the gesture templates in the gesture template libraries of different angle classes, so as to find out the gesture templates most resembling the edge parts in the gesture template libraries of different angle classes, respectively;
f. finding out an optimal gesture template from the resembling gesture templates at different angles found out in the previous step; and
g. displaying a gesture image represented by the optimal gesture template found out in the previous step.

17. The gesture recognition method according to claim 16, wherein the image data is a color image.

18. The gesture recognition method according to claim 16, wherein the step of establishing the template database is to classify edge pixels constituting the gesture edges according to the angle of each edge pixel in the gesture edges, gather the edge pixels within the same angle range to form the gesture template, and then store the gesture templates of different angles in the template database with different angle classes, respectively.

19. The gesture recognition method according to claim 16, wherein a skin part is filtered from the color digital image by using a skin processing method, and the skin edge of the skin part is found out with an edge detection filter.

20. The gesture recognition method according to claim 17, wherein a skin part is filtered from the color digital image by using a skin processing method, the skin part is then converted into a gray-scale image, and the skin edge of the skin part is found out with an edge detection filter.

21. The gesture recognition method according to claim 20, wherein sets of the edge pixels within the same angle ranges are respectively found out from the edge pixels constituting the skin edge, then stored as the edge parts, and further classified into the edge parts of different angle classes according to the angles of the edge pixels contained in the edge parts.

22. The gesture recognition method according to claim 21, wherein gradients of the edge pixels of the skin edge in horizontal and vertical directions are calculated by using an edge detector to obtain the angles, and then the edge pixels are classified into the edge parts at different angles according to the angles.

23. The gesture recognition method according to claim 19, wherein the edge detector is a Sobel filter.

24. The gesture recognition method according to claim 16, wherein the skin edge is classified into eight angle ranges equally dividing a 360° round angle.

25. The gesture recognition method according to claim 16, wherein a similarity between the gesture template and the edge part is obtained by using a distance transform (DT) technology.

26. The gesture recognition method according to claim 25, wherein the DT technology performs a DT operation on the edge part to produce a DT image, and searches each position in the DT image by using the gesture template, then performs a convolution operation on the gesture template and the DT image at each of the search positions to generate an approximate value representing a similarity between the gesture template and the DT image, and finds out the gesture template with the smallest approximate value, and finally sends the gesture template with the smallest approximate value to the optimal template selection means.

27. The gesture recognition method according to claim 16, wherein several predetermined equally divided positions of the gesture template in the edge part are first searched to find out a scope where the hand is most likely to appear, and then a fine template matching is performed on the scope.

28. The gesture recognition method according to claim 27, wherein the scope where the hand is most likely to appear refers to a scope with a number of the appearing skin pixels greater than a threshold.

* * * * *